US011038975B2

(12) United States Patent
Chen

(10) Patent No.: US 11,038,975 B2
(45) Date of Patent: Jun. 15, 2021

(54) INFORMATION PUSHING METHOD AND DEVICE

(71) Applicants: Beijing Jingdong Shangke Information Technology Co., Ltd., Beijing (CN); Beijing Jingdong Century Trading Co., Ltd., Beijing (CN)

(72) Inventor: Jie Chen, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 145 days.

(21) Appl. No.: 16/321,379

(22) PCT Filed: Jul. 14, 2017

(86) PCT No.: PCT/CN2017/092994
§ 371 (c)(1),
(2) Date: Jan. 28, 2019

(87) PCT Pub. No.: WO2018/019139
PCT Pub. Date: Feb. 1, 2018

(65) Prior Publication Data
US 2019/0166216 A1    May 30, 2019

(30) Foreign Application Priority Data
Jul. 29, 2016   (CN) .......................... 201610620675.5

(51) Int. Cl.
*H04L 29/08*   (2006.01)
*G06F 16/9535*  (2019.01)
*G06F 16/00*   (2019.01)

(52) U.S. Cl.
CPC .............. *H04L 67/26* (2013.01); *G06F 16/00* (2019.01); *G06F 16/9535* (2019.01); *H04L 67/02* (2013.01); *H04L 67/325* (2013.01)

(58) Field of Classification Search
CPC ....... H04L 67/26; H04L 67/02; H04L 67/325; G06F 16/00; G06F 16/9535
See application file for complete search history.

(56) References Cited

U.S. PATENT DOCUMENTS 9,277,023 B1    3/2016 Onnen
2008/0065688 A1*  3/2008 Shenfield ................ H04L 67/04
(Continued)

FOREIGN PATENT DOCUMENTS

CN    101262497 A    9/2008
CN    101656617 A    2/2010
(Continued)

OTHER PUBLICATIONS

International Search Report in International Patent Application No. PCT/CN2017/092994, dated Oct. 20, 2017 (4 pages, w/English Translation).
(Continued)

*Primary Examiner* — Nicholas R Taylor
*Assistant Examiner* — Sanjoy Roy
(74) *Attorney, Agent, or Firm* — Nixon Peabody LLP

(57) ABSTRACT

An information pushing method and device. One particular embodiment of the method includes: acquiring a push instruction; acquiring information about at least one candidate push user with the category of push information the same as the category of to-be-pushed information; according to the push instruction and the information about at least one candidate push user, selecting at least one to-be-pushed user; and pushing the to-be-pushed information to the at least one to-be-pushed user. The method realizes that the push infor-
(Continued)

mation is sent to the same user only once within a certain time length, thus preventing too much interference to a user.

12 Claims, 5 Drawing Sheets

(56) References Cited

U.S. PATENT DOCUMENTS

| | | | | |
|---|---|---|---|---|
| 2008/0182559 | A1* | 7/2008 | Pyhalammi | ......... H04L 12/1485 455/412.1 |
| 2009/0125585 | A1* | 5/2009 | Krishnaswamy | ..... H04L 67/322 709/203 |
| 2011/0131321 | A1* | 6/2011 | Black | .................... G06F 1/3203 709/224 |
| 2011/0218951 | A1* | 9/2011 | Kline | ...................... H04L 67/26 706/12 |
| 2013/0067024 | A1* | 3/2013 | Vasters | ................... G06F 9/542 709/217 |
| 2015/0213024 | A1* | 7/2015 | Frankel | ............... H04L 12/1895 707/758 |
| 2015/0248412 | A1 | 9/2015 | Wu | |
| 2015/0341457 | A1 | 11/2015 | Huang et al. | |
| 2016/0285988 | A1* | 9/2016 | Xu | ......................... H04L 67/36 |

FOREIGN PATENT DOCUMENTS

| | | |
|---|---|---|
| CN | 102902733 A | 1/2013 |
| CN | 103327110 A | 9/2013 |
| CN | 103714067 A | 4/2014 |
| CN | 104063454 A | 9/2014 |
| CN | 104636477 A | 5/2015 |
| CN | 104735486 A | 6/2015 |
| CN | 105491539 A | 4/2016 |
| WO | 2011079577 A1 | 7/2011 |

OTHER PUBLICATIONS

Written Opinion in International Patent Application No. PCT/CN2017/092994, dated Oct. 20, 2017 (6 pages, w/English Translation).

* cited by examiner

INFORMATION PUSHING METHOD AND DEVICE

CROSS-REFERENCE TO RELATED APPLICATIONS

This application is a U.S. National Stage of International Application Patent No. PCT/CN2017/092994, filed on Jul. 14, 2017, which claims priority to Chinese Patent Application No. "201610620675.5", filed on Jul. 29, 2016, both of which are incorporated herein by reference in their entireties.

TECHNICAL FIELD

The present disclosure relate to the field of computer technology, specifically to the field of Internet technology, and more specifically to an information pushing method and device.

BACKGROUND

Information Push, also known as "webcasting", is a technology that reduces information overload by pushing the information a user needs on the Internet through a certain technical standard or protocol. By actively pushing information to the user, information push technology may reduce the time it consumes for the user to search on the network. However, information push usually does not perform user screening, so that there may be cases where the same user is pushed multiple times of information in a certain period, causing too much interference to the user.

At present, a Bulong filter is generally used to solve the above problem. First, a huge hashtable is created, for each user who has received push information, eight different hash algorithms are used to generate eight hash values, the eight hash values are mapped to eight coordinates in the hashtable, and then the values of the eight coordinates are all set to 1. When it is required to push the information to the user, first, the eight different hash algorithms are used for the user to generate eight hash values, and then the eight hash values are mapped to the eight coordinates in the hashtable. If each coordinate is 1, it means that the user has received the push information, the information is not pushed to the user again; and if at least one coordinate is not 1, it means that the information has not been pushed to the user, thus, a list of users to be pushed with information is obtained.

However, the Bulong filter filters all the users who have received the push information. Therefore, it is impossible to push the information again to users who have received the push information after a certain time length. Moreover, for the Bulong filter, it has a risk of misjudgment. If the eight coordinates corresponding to a user who has not received the push information are exactly set to 1, the user is also erroneously judged to have received the push information.

SUMMARY

The objective of the present disclosure is to propose an improved information pushing method and device to solve the technical problem mentioned in the Background section.

In a first aspect, the present disclosure provides an information pushing method, including: acquiring a push instruction, the push instruction including: to-be-pushed information, a category of the to-be-pushed information, a planned push time of the to-be-pushed information and a push interval of the to-be-pushed information; acquiring information about at least one candidate push user with a category of push information same as the category of the to-be-pushed information, the information about the at least one candidate push user including the category of the push information, a planned push time of the push information, a push interval of the push information, and a push status; selecting, based on the push instruction and the information about the at least one candidate push user, at least one to-be-pushed user, the at least one to-be-pushed user being a candidate push user not receiving the push information in a time length, a starting point of the of the time length being one push interval succeeding the planned push time of the to-be-pushed information, and an ending point being a push interval succeeding the planned push time of the to-be-pushed information; and pushing the to-be-pushed information to the at least one to-be-pushed user.

In some embodiments, the selecting, based on the push instruction and the information about the at least one candidate push user, at least one to-be-pushed user includes: calculating, based on the information about the at least one candidate push user, a screening value $X_i$ of the at least one candidate push user using the following formula: $X_i = 2^{(t_i-t_0+n)}$; where, i is a positive integer, and t≥1, t is the planned push time of the push information, $t_i$ is a planned push time of push information about an $i^{th}$ candidate push user, $t_0$ is a current time, n is the push interval of the push information, X is a screening value of the candidate push user, and $X_i$ is the screening value of the $i^{th}$ candidate push user; and determining, for each candidate push user in the at least one candidate push user, if the screening value of the candidate push user does not exist, the candidate push user as the to-be-pushed user.

In some embodiments, the selecting, based on the push instruction and the information about the at least one candidate push user, at least one to-be-pushed user further includes: calculating, in response to the screening value of the candidate push user exists, based on the push instruction, a screening judgment value Y of the push instruction using the following formula: $Y = 2^{(T-t_0+2m+1)} - 2^{(T-t_0)}$; where, T is the planned push time of the to-be-pushed information, $t_0$ is a current time, m is the push interval of the to-be-pushed information, and the push interval of the to-be-pushed information m is equal to the push interval of the push information n; and performing an AND-operation on a binary value of the screening judgment value of the push instruction and a binary value of the screening value of the at least one candidate push user, determining whether a result is equal to 0, and determining the candidate push user as the to-be-pushed user, in response to the result being equal to 0.

In some embodiments, after the acquiring information about at least one candidate push user with a category of push information same as the category of the to-be-pushed information, the method further includes: updating, based on the push instruction, information about the at least one to-be-pushed user, where the information about the at least one to-be-pushed user includes: a the category of the push information, the planned push time of the push information, the push interval of the push information, and the push status.

In some embodiments, after the pushing the to-be-pushed information to the at least one to-be-pushed user, the method further includes: updating, based on the push instruction, the information about the at least one to-be-pushed user, where the information about the at least one to-be-pushed user includes: the category of the push information, the planned push time of the push information, the push interval of the push information, and the push status.

In a second aspect, the present disclosure provides an information pushing device, including: a first acquisition unit, configured to acquire a push instruction, the push instruction including: to-be-pushed information, a category of the to-be-pushed information, a planned push time of the to-be-pushed information and a push interval of the to-be-pushed information; a second acquisition unit, configured to acquire information about at least one candidate push user with a category of push information the same as the category of the to-be-pushed information, the information about the at least one candidate push user including the category of the push information, a planned push time of the push information, a push interval of the push information, and a push status; a selection unit, configured to select, based on the push instruction and the information about the at least one candidate push user, at least one to-be-pushed user, the at least one to-be-pushed user being a candidate push user not receiving the push information in a time length, a starting point of the time length being one push interval succeeding the planned push time of the to-be-pushed information, and an ending point being a push interval succeeding the planned push time of the to-be-pushed information; and a pushing unit, configured to push the to-be-pushed information to the at least one to-be-pushed user.

In some embodiments, the selection unit includes: a first calculation subunit, configured to calculate, based on the information about at least one candidate push user, a screening value $X_i$ of the at least one candidate push user using the following formula: $X_i=2^{(t_i-t_0+n)}$; where, i is a positive integer, and i≤1, t is the planned push time of the push information, $t_i$ is a planned push time of push information about an $i^{th}$ candidate push user, $t_0$ is a current time, n is the push interval of the push information, X is a screening value of the candidate push user, and $X_i$ is the screening value of the $i^{th}$ candidate push user; and a first determination subunit, configured to determine, for each candidate push user in the at least one candidate push user, if the screening value of the candidate push user does not exist, the candidate push user as the to-be-pushed user.

In some embodiments, the selection unit further includes: a second calculation subunit, configured to calculate, in response to the screening value of the candidate push user exists, based on the push instruction, a screening judgment value Y of the push instruction using the following formula: $Y=2^{(T-t_0+2m+1)}-2^{(T-t_0 0)}$; where, T is the planned push time of the to-be-pushed information, $t_0$ is a current time, m is the push interval of the to-be-pushed information, and the push interval of the to-be-pushed information m is equal to the push interval of the push information n; and a second determination subunit, configured to perform an AND-operation on a binary value of the screening judgment value of the push instruction and a binary value of the screening value of the at least one candidate push user, determine whether a result is equal to 0, and determine the candidate push user as the to-be-pushed user, in response to the result being equal to 0.

In some embodiments, the device further includes: a first updating unit, configured to update, based on the push instruction, information about the at least one to-be-pushed user, where the information about the at least one to-be-pushed user includes: a category of the push information, a planned push time of the push information, a push interval of the push information, and a push status.

In some embodiments, the device further includes: a second updating unit, configured to update, based on the push instruction, the information about the at least one to-be-pushed user, where the information about the at least one to-be-pushed user includes: the category of the push information, the planned push time of the push information, the push interval of the push information, and the push status.

The information pushing method and device provided by the present disclosure acquires a push instruction and information about at least one candidate push user, then according to the push instruction and the information about at least one candidate push user, selects a to-be-pushed user, and finally pushes the to-be-pushed information to the to-be-pushed user. Here, the to-be-pushed user is a candidate push user not receiving the push information in a certain time length. The method and device realizes that the push information is sent to the same user only once within a certain time length, thus preventing too much interference to the user.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It may be appreciated that the specific embodiments described herein are merely used for explaining the relevant disclosure, rather than limiting the disclosure. In addition, it should be noted that, for the convenience of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
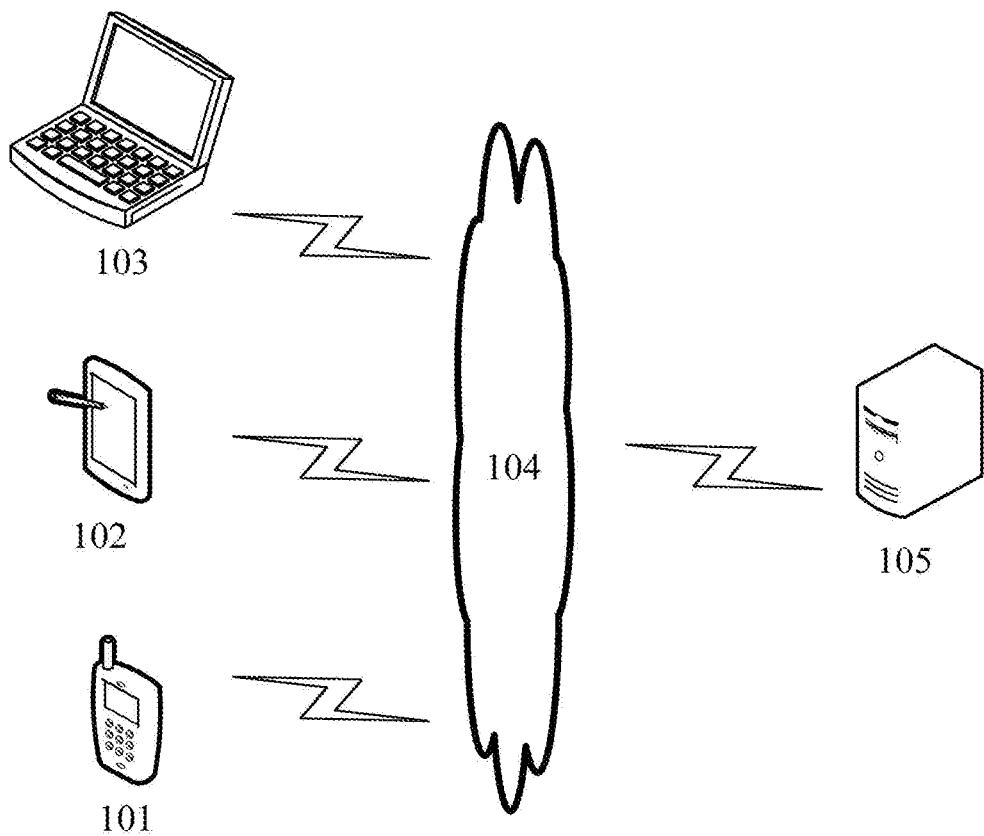
FIG. 1 is an exemplary system architecture diagram to which the present disclosure may be applied.

FIG. 1 illustrates an exemplary system architecture 100 to which an information pushing method or an information pushing device of the present disclosure may be applied.

As shown in FIG. 1, the system architecture 100 may include terminal devices 101, 102, 103, a network 104, and a server 105. The network 104 is configured to provide a communication link medium between the terminal devices 101, 102, 103 and the server 105. The networks 104 may include various types of connections, such as wired, wireless communication links, or optical fibers.

The user may interact with the server 105 through the network 104 using the terminal devices 101, 102, 103, to receive or send messages and the like. Various communication client applications, such as social platform software, email clients, instant messaging tools, shopping applications, webpage browser applications, and search applications, may be installed on the terminal devices 101, 102, and 103.

The terminal devices 101, 102, 103 may be various electronic devices having display screens and capable of receiving information, including but not limited to smart phones, tablets, e-book readers, laptop portable computers, and desktop computers.

The server 105 may be a server that provides various services, such as an information pushing server that provides support for push information received by the terminal devices 101, 102, 103. The information pushing server may perform processing such as analysis on a received push instruction, and send the processing result (for example, push information) to the terminal devices.

It should be noted that the information pushing method provided by the embodiments of the present disclosure is generally executed by the server 105, and accordingly, the information pushing device is generally provided in the server 105.

It should be understood that the number of terminal devices, networks, and servers in FIG. 1 is merely illustrative. Depending on the implementation needs, there may be any number of terminal devices, networks, and servers.

Figure 2:
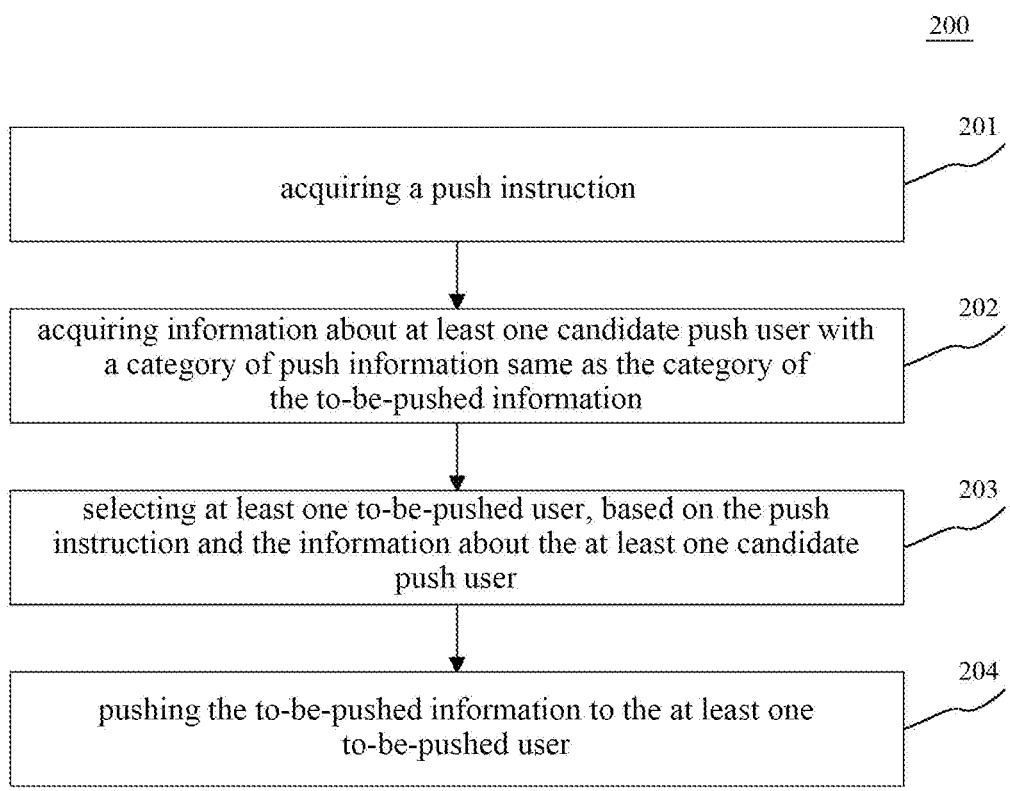
FIG. 2 is a flowchart of an embodiment of an information pushing method according to the present disclosure.

With further reference to FIG. 2, a flow 200 of an embodiment of an information pushing method according to the present disclosure is illustrated. The information pushing method includes the following steps:

Step 201, acquiring a push instruction.

In the present embodiment, the electronic device (for example, the server shown in FIG. 1) on which the information pushing method is performed may receive a push instruction through a wired connection or a wireless connection. The push instruction includes: to-be-pushed information, the category of the to-be-pushed information, the planned push time of the to-be-pushed information and the push interval of the to-be-pushed information.

Generally, the category of the to-be-pushed information may be notification information, promotion information, and the like. For example, the notification information may be warm reminding information, weather information, or blessing information, etc.; the promotion information may be information of new commodities offering on the market or price reduction sales information of commodities. Actively push information may reduce the time spent by the user searching on the network, but if the same user is frequently sent with push information within a certain period, it may cause too much interference to the user. In order to solve the above problem, the planned push time and the push interval of the to-be-pushed information may be set for each push instruction, where the push interval of the same type of to-be-pushed information may be the same. For example, the push interval of the notification information may be set to 1 day, therefore, a notification message is sent to a same user only once within 1 day; and the push interval of the promotion information may be set to 3 days, therefore, the promotion information is sent to a same user only once within 3 days.

Step 202, acquiring information about at least one candidate push user with a category of push information same as the category of the to-be-pushed information.

In the present embodiment, based on the push instruction obtained in step 201, the electronic device (for example, the server shown in FIG. 1) may first acquire the category of the to-be-pushed information; and then acquire, based on the category of the to-be-pushed information, at least one candidate push user with the category of the push information the same as the category of the to-be-pushed information, thereby acquiring information about the at least one candidate push user. The information about the at least one candidate push user includes: the category of the push information, the planned push time of the push information, the push interval of the push information, and the push status.

Generally, the candidate push user may be an unpushed and unscheduled user, or may be a scheduled user, or may be a pushed user. For an unpushed and unscheduled user, the planed push time and push interval of the push information may be blank, and the push status is set to unpushed. The information about the candidate push user may be stored in the server. When the user registers an application account, browses a webpage, or purchases a product, the server may acquire the above records, and extract valuable information based on the above records to update the information about the candidate push user. Certainly, the information about the candidate push user may also be updated based on the push information received by the candidate push user last time.

Step 203, selecting, based on the push instruction and the information about the at least one candidate push user, at least one to-be-pushed user.

In the present embodiment, based on the push instruction obtained in step 201 and the information about the at least one candidate push user obtained in step 202, the electronic device (for example, the server shown in FIG. 1) may select at least one to-be-pushed user. Here, the at least one to-be-pushed user is a candidate push user not receiving the push information in a time length. The starting point of the time length is one push interval preceding the planned push time of the to-be-pushed information, and the ending point is a push interval succeeding the planned push time of the to-be-pushed information.

Alternatively, the at least one to-be-pushed user in the present embodiment may be an unpushed and unscheduled user, or may be a scheduled or pushed candidate push user will not receiving the push information in a certain time length. However, the information planed to be pushed by the current push instruction may not cause too much interference to the above to-be-pushed user.

Step 204, pushing the to-be-pushed information to the at least one to-be-pushed user.

In the present embodiment, the electronic device may push the to-be-pushed information in the push instruction to the at least one to-be-pushed user. For example, the electronic device may send the to-be-pushed information to the to-be-pushed user by means of a short message or a combination of webpage content.

In some alternative implementations of the present embodiment, after the acquiring information about at least one candidate push user with a category of push information same as the category of the to-be-pushed information, information about the at least one to-be-pushed user may also be updated based on the push instruction. The information about the at least one to-be-pushed user includes: the category of the push information, the planned push time of the push information, the push interval of the push information, and the push status. For example, a piece of promotion task information is expected to be pushed to the user A on Aug. 1, 2016, and the push interval is 3 days. Therefore, the category of the push information of the user A may be updated to the promotion category, the planned push date of the push information is updated to Aug. 1, 2016, the push interval of the push information is updated to 3 days, and the push status is updated to "to be pushed".

In some alternative implementations of the present embodiment, after the pushing the to-be-pushed information to the at least one to-be-pushed user, the information about the at least one to-be-pushed user may also be updated based on the push instruction. The information about the at least one to-be-pushed user includes: the category of the push information, the planned push time of the push information, the push interval of the push information, and the push status. For example, after receiving the to-be-pushed information, the user A may also update the push status of the user A to "pushed".

Figure 3:
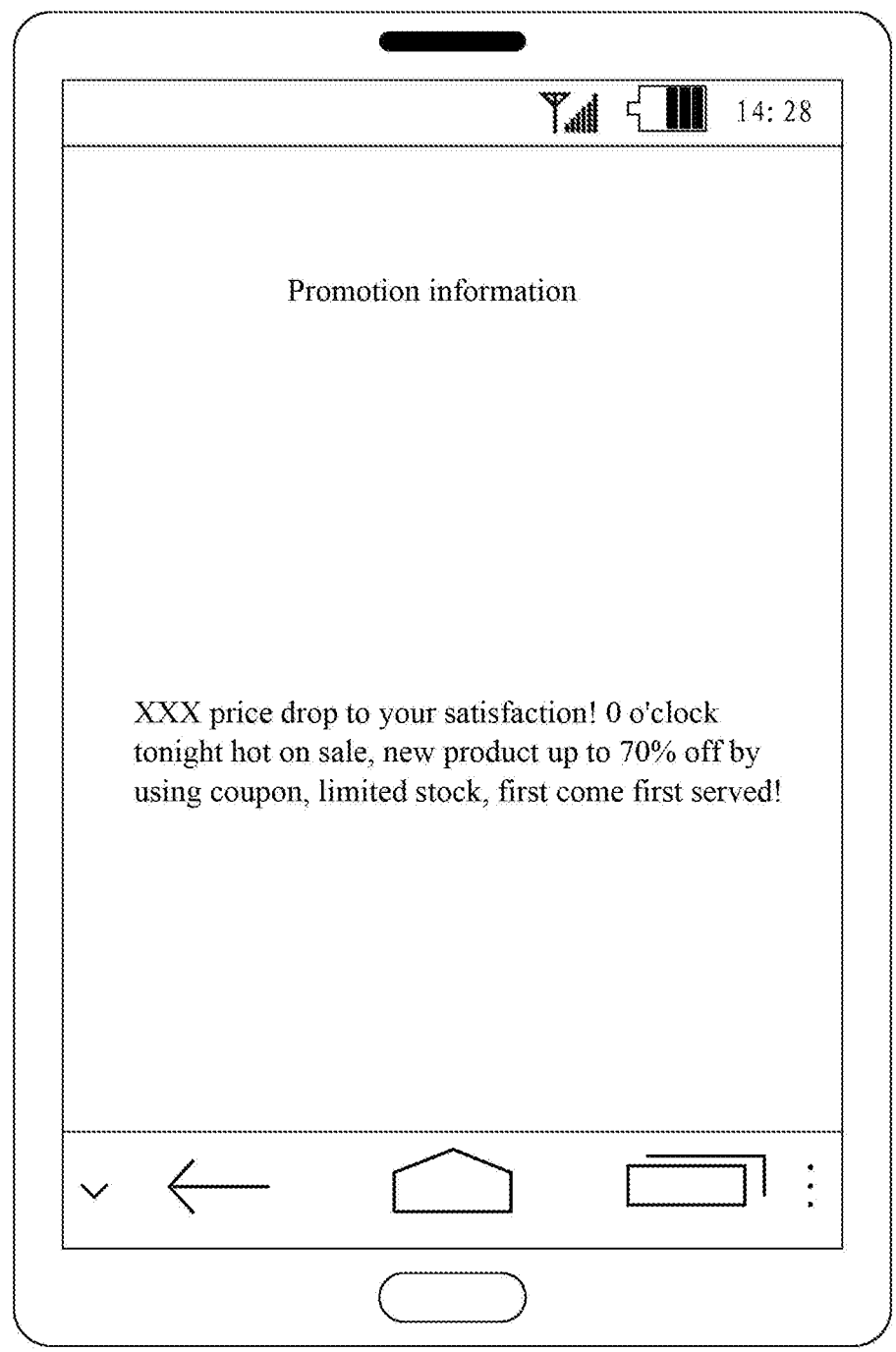
FIG. 3 is a schematic diagram of an application scenario of the information pushing method according to the present disclosure.

With further reference to FIG. 3, FIG. 3 is a schematic diagram of an application scenario of the information pushing method according to the present embodiment. In the application scenario of FIG. 3, when a user downloads a shopping application, registers a shopping application, or browses certain products, it indicates that the user may have a demand for certain products; after analyzing the user's demands, promotion information of certain products may be pushed to the user; in order to prevent too much interference to the user, it may first be determined whether the user may receive promotion information of certain products in a certain time interval; and finally, information is pushed to the user on the premise of not overly disturbing the user. When the user receives the push information, the push information is displayed on the terminal as shown in FIG. 3.

The method provided by the above embodiments of the present disclosure selects at least one to-be-pushed user that does not receive the push information in a certain time length, and pushes information to the selected user, which realizes that the push information is sent to the same user only once within a certain time, thus preventing too much interference to the user.

Figure 4:
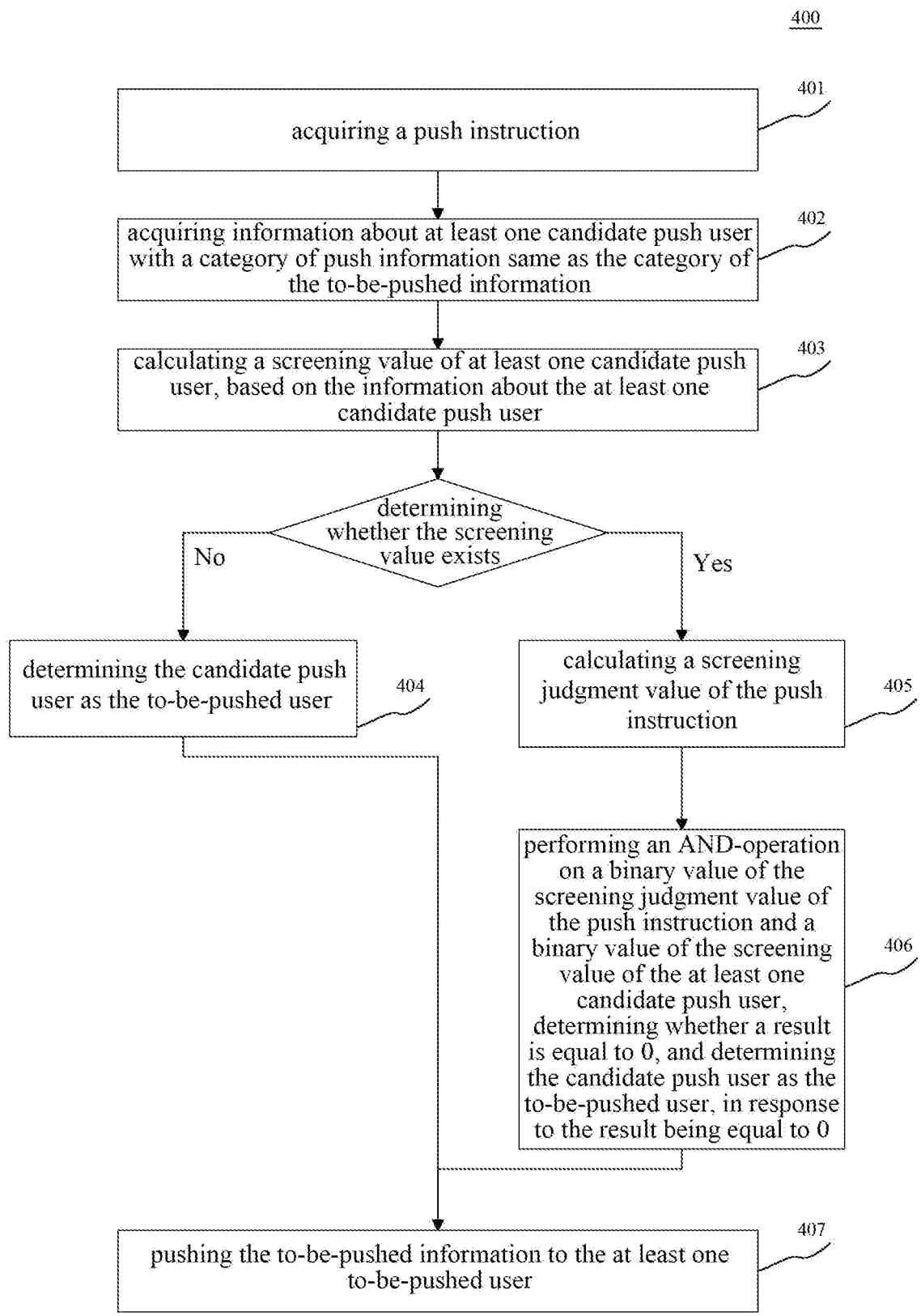
FIG. 4 is a flowchart of another embodiment of the information pushing method according to the present disclosure.

With further reference to FIG. 4, a flow 400 of another embodiment of the information pushing method is shown. The flow 400 of the information pushing method includes the following steps:

Step 401, acquiring a push instruction.

In the present embodiment, the electronic device (for example, the server shown in FIG. 1) on which the information pushing method operate may receive a push instruction through a wired connection or a wireless connection. The push instruction includes: to-be-pushed information, the category of the to-be-pushed information, the planned push time of the to-be-pushed information and the push interval of the to-be-pushed information.

Step 402, acquiring information about at least one candidate push user with a category of push information same as the category of the to-be-pushed information.

In the present embodiment, based on the push instruction obtained in step 201, the electronic device (for example, the server shown in FIG. 1) may first acquire the category of the to-be-pushed information; and then acquire, based on the category of the to-be-pushed information, at least one candidate push user with the category of the push information the same as the category of the to-be-pushed information, thereby acquiring information about the at least one candidate push user. The information about the at least one candidate push user includes: the category of the push information, the planned push time of the push information, the push interval of the push information, and the push status.

Step 403, calculating, based on the information about at least one candidate push user, a screening value $X_i$ of the at least one candidate push user using the following formula: $X_i=2^{(t_i-t_0+n)}$.

In the present embodiment, based on the information about at least one candidate push user obtained in step 402, the electronic device (for example, the server shown in FIG. 1) may obtain the screening value of at least one to-be-pushed user. Here, i is a positive integer, and u≥1, t is the planned push time of the push information, $t_i$ is the planned push time of push information about the $i^{th}$ candidate push user, $t_0$ is the current time, n is the push interval of the push information, X is the screening value of the candidate push user, and $X_i$ is the screening value of the $i^{th}$ candidate push user.

The screening value of each candidate push user is calculated by using the formula, and the unique identifier of each candidate push user and the corresponding screening value is combined into a key value pair to put into a hashmap. For example, the unique identifier of the user may be the mobile phone number of the user or the email account of the user. The null value and the null key may be used in the hashmap, that is, when the screening value of the candidate push user does not exist, the user unique identifier of the candidate push user and the null value may also be put into the hashmap.

Step 404, determining, for each candidate push user in the at least one candidate push user, if the screening value of the candidate push user does not exist, the candidate push user as the to-be-pushed user.

In the present embodiment, based on the screening value of the at least one to-be-pushed user obtained in step 403, the electronic device (for example, the server shown in FIG. 1) may determine the candidate push user as the to-be-pushed user, if the screening value does not exist.

Generally, the screening value of the candidate push user matched with the unique identifier of the user may be selected from the hashmap based on the unique identifier of the user. If the screening value is null, the candidate push user is an unpushed and unscheduled user, and the candidate push user may be included in the list of to-be-pushed users.

Step 405, calculating, in response to the screening value of the candidate push user existing, based on the push instruction, a screening judgment value Y of the push instruction using the following formula: $Y=2^{(T-t_0+2m+1)}-2^{(T-t_0)}$.

In the present embodiment, based on the push instruction obtained in step 401, the electronic device (for example, the server shown in FIG. 1) may obtain the screening judgment value of the push instruction. Here, T is the planned push time of the to-be-pushed information, $t_0$ is the current time, m is the push interval of the to-be-pushed information, and the push interval of the to-be-pushed information m is equal to the push interval of the push information n.

If the screening value of the candidate push user stored in the hashmap exists, it indicates that the candidate push user is a pushed or scheduled user. Therefore, it is necessary to further determine whether the candidate push user receives the push information in a certain time length.

Step 406, performing an AND-operation on a binary value of the screening judgment value of the push instruction and a binary value of the screening value of the at least one candidate push user, determining whether a result is equal to 0, and determining the candidate push user as the to-be-pushed user, in response to the result being equal to 0.

In the present embodiment, based on the screening value of the at least one to-be-pushed user obtained in step 403 and the screening judgment value of the push instruction obtained in step 405, the electronic device (for example, the server shown in FIG. 1) may determine whether the candidate push user is the to-be-pushed user, when the screening value exists.

The AND operation is performed by using the binary value of the screening judgment value of the push instruction and the binary value of the screening value of the candidate push user, and the result is equal to 0, which indicates that the candidate push user does not receive the push information in a certain time length. Therefore, the candidate push user may be included in the list of to-be-pushed users.

Step 407, pushing the to-be-pushed information to the at least one to-be-pushed user.

In the present embodiment, the electronic device may push the to-be-pushed information in the push instruction to the at least one to-be-pushed user. For example, the electronic device may send the to-be-pushed information to the to-be-pushed user by means of a short message or in a combination of webpage content.

As can be seen from FIG. 4, compared with the embodiment corresponding to FIG. 2, the flow 400 of the information pushing method in the present embodiment introduces the steps of determining the to-be-pushed user in detail. Therefore, the solution described in the present embodiment may more accurately judge that the candidate push user does not receive the push information in a certain—time length, and does not have a misjudgment, thereby preventing too much interference to the user, while selecting as many to-be-pushed users as possible to push information.

Figure 5:
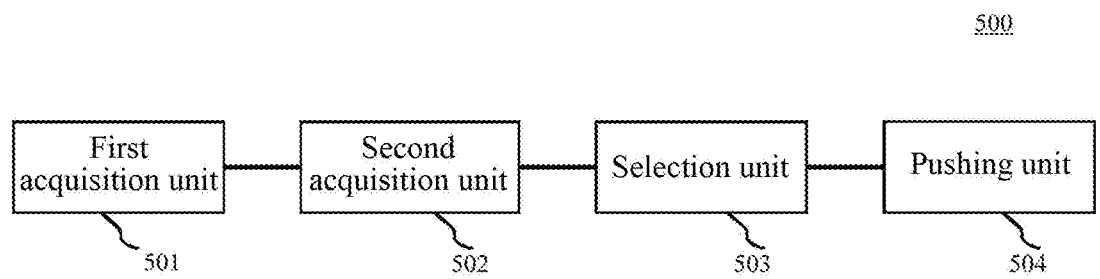
FIG. 5 is a schematic structural diagram of an embodiment of an information pushing device according to the present disclosure.

With further reference to FIG. 5, as an implementation to the method shown in the above figures, the present disclosure provides an embodiment of an information pushing device. The device embodiment corresponds to the method embodiment shown in FIG. 2, and the device may specifically be applied to various electronic devices.

As shown in FIG. 5, the information pushing device 500 of the present embodiment includes: a first acquisition unit 501, a second acquisition unit 502, a selection unit 503 and a pushing unit 504. The first acquisition unit 501 is configured to acquire a push instruction. The second acquisition unit 502 is configured to acquire information about at least one candidate push user with a category of push information the same as the category of the to-be-pushed information. The selection unit 503 is configured to select, based on the push instruction and the information about the at least one candidate push user, at least one to-be-pushed user. The pushing unit 504 is configured to push the to-be-pushed information to the at least one to-be-pushed user.

In the present embodiment, the first acquisition unit 501 of the information pushing device 500 may receive a push instruction through a wired connection or a wireless connection. The push instruction includes: to-be-pushed information, the category of the to-be-pushed information, the planned push time of the to-be-pushed information and the push interval of the to-be-pushed information.

In the present embodiment, based on the push instruction obtained by the first acquisition unit 501, the second acquisition unit 502 may first acquire the category of the to-be-pushed information; and then acquire, based on the category of the to-be-pushed information, at least one candidate push user with the category of the push information the same as the category of the to-be-pushed information, thereby acquiring information about the at least one candidate push user. The information about the at least one candidate push user includes: the category of the push information, the planned push time of the push information, the push interval of the push information, and the push status.

In the present embodiment, based on the push instruction obtained by the first acquisition unit 501 and the information about at least one candidate push user obtained by the second acquisition unit 502, the selection unit 503 may select at least one to-be-pushed user. Here, the at least one to-be-pushed user is a candidate push user not receiving the push information in a time length. The starting point of the time length is a push interval preceding the planned push time of the to-be-pushed information, and the ending point is a push interval succeeding the planned push time of the to-be-pushed information.

In the present embodiment, based on the at least one to-be-pushed user selected by the selection unit 503, the pushing unit 504 may push the to-be-pushed information to the at least one to-be-pushed user. For example, the electronic device may send the to-be-pushed information to the to-be-pushed user by means of a short message or in a combination of webpage content.

In some alternative implementations of the present embodiment, the selection unit 503 includes: a first calculation subunit, configured to calculate, based on the information about at least one candidate push user, a screening value $X_i$ of the at least one candidate push user using the following formula: $X_i = 2^{(t_i - t_0 + n)}$; where, i is a positive integer, and i≥1, t is the planned push time of the push information, $t_i$ is a planned push time of push information about an $i^{th}$ candidate push user, $t_0$ is a current time, n is the push interval of the push information, X is a screening value of the candidate push user, and $X_i$ is the screening value of the $i^{th}$ candidate push user; and a first determination subunit, configured to determine, for each candidate push user in the at least one candidate push user, if the screening value of the candidate push user does not exist, the candidate push user as the to-be-pushed user.

In some alternative implementations of the present embodiment, the selection unit 503 further includes: a second calculation subunit, configured to calculate, in response to the screening value of the candidate push user exists, based on the push instruction, a screening judgment value Y of the push instruction using the following formula: $Y = 2^{(T - t_0 + 2m + 1)} - 2^{(T - t_0)}$; where, T is the planned push time of the to-be-pushed information, $t_0$ is a current time, m is the push interval of the to-be-pushed information, and the push interval of the to-be-pushed information m is equal to the push interval of the push information n; and a second determination subunit, configured to perform an AND-operation on a binary value of the screening judgment value of the push instruction and a binary value of the screening value of the at least one candidate push user, determine whether a result is equal to 0, and determine the candidate push user as the to-be-pushed user in response to the result being equal to 0.

In some alternative implementations of the present embodiment, the information pushing device 500 further includes: a first updating unit, configured to update, based on the push instruction, information about the at least one to-be-pushed user, where the information about the at least one to-be-pushed user includes: a category of the push information, a planned push time of the push information, a push interval of the push information, and a push status.

In some alternative implementations of the present embodiment, the information pushing device 500 further includes: a second updating unit, configured to update, based on the push instruction, the information about the at least one to-be-pushed user, where the information about the at least one to-be-pushed user includes: the category of the push information, the planned push time of the push information, the push interval of the push information, and the push status.

Figure 6:
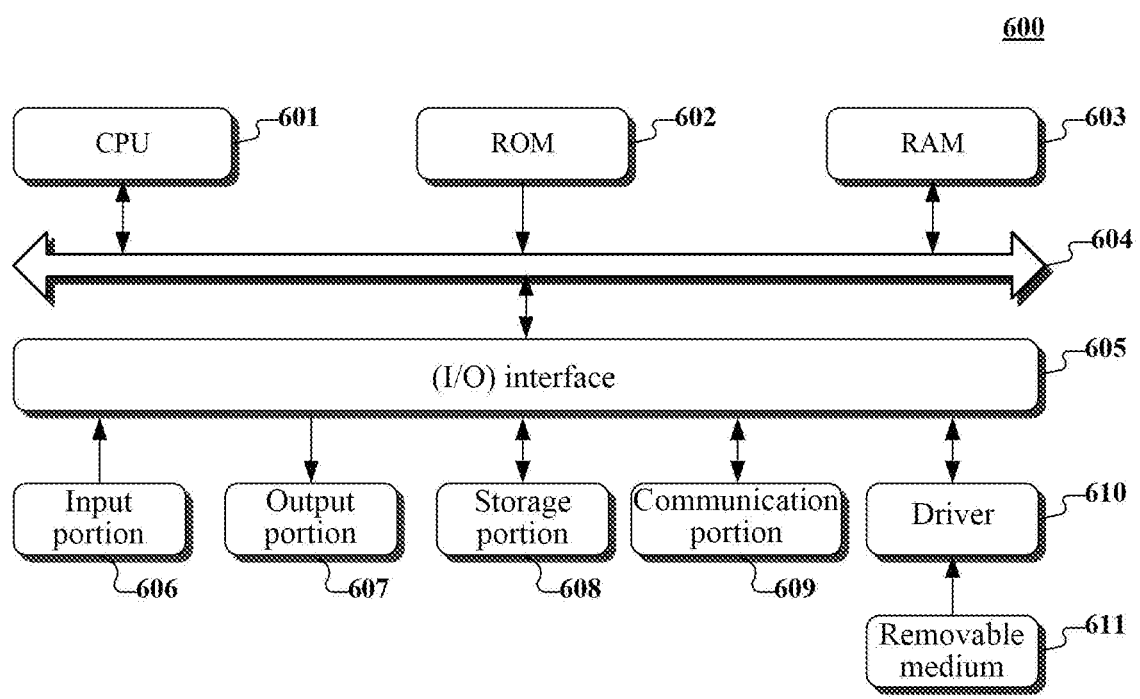
FIG. 6 is a schematic structural diagram of a computer system adapted to implement a server of the embodiments of the present disclosure.

Referring to FIG. 6, a schematic structural diagram of a computer system 600 adapted to implement a terminal device or a server of the embodiments of the present disclosure is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the method of the present disclosure.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including a first acquisition unit, a second acquisition unit, a selection unit and a pushing unit, where the names of these units do not in some cases constitute a limitation to such units themselves. For example, the first acquisition unit may also be described as "a unit for acquiring a push instruction.

In another aspect, the present disclosure further provides a non-volatile computer storage medium. The non-volatile computer storage medium may be the non-volatile computer storage medium included in the device in the above described embodiments, or a stand-alone non-volatile computer storage medium not assembled into the terminal. The non-volatile computer storage medium stores one or more programs. The one or more programs, when executed by a device, cause the device to: acquire a push instruction, the push instruction including: to-be-pushed information, a category of the to-be-pushed information, a planned push time of the to-be-pushed information and a push interval of the to-be-pushed information; acquire information about at least one candidate push user with a category of push information same as the category of the to-be-pushed information, the information about at least one candidate push user including the category of the push information, a planned push time of the push information, a push interval of the push information, and a push status; select, based on the push instruction and the information about at least one candidate push user, at least one to-be-pushed user, the at least one to-be-pushed user being a candidate push user not receiving the push information in a time length, a starting point of the time length being a push interval preceding the planned push time of the to-be-pushed information, and an ending point being a push interval succeeding the planned push time of the to-be-pushed information; and push the to-be-pushed information to the at least one to-be-pushed user.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. An information pushing method, the method comprising:
   acquiring a push instruction, the push instruction comprising: to-be-pushed information, a category of the to-be-pushed information, a planned push time of the to-be-pushed information and a push interval of the to-be-pushed information;

acquiring information about at least one candidate push user with a category of push information same as the category of the to-be-pushed information, the information about a candidate push user comprising: the category of the push information, a planned push time of the push information, the push information being pushed to the candidate push user at the planned push time of the push information, a push interval of the push information, and a push status;

selecting, based on the push instruction and the information about the at least one candidate push user, at least one to-be-pushed user, the at least one to-be-pushed user being at least one candidate push user not receiving the push information in a time length, a starting point of the time length being one push interval preceding the planned push time of the to-be-pushed information, and an ending point being a push interval succeeding the planned push time of the to-be-pushed information; and pushing the to-be-pushed information to the at least one to-be-pushed user.

2. The method according to claim 1, wherein the selecting, based on the push instruction and the information about the at least one candidate push user, at least one to-be-pushed user comprises:

calculating, based on the information about the at least one candidate push user, a screening value $X_i$ of the at least one candidate push user using a following formula:

$$X_i = 2^{(t_i - t_0 + n)};$$

wherein, i is a positive integer, and i≥1, t is the planned push time of the push information, $t_i$ is a planned push time of push information about an $i^{th}$ candidate push user, $t_0$ is a current time, n is the push interval of the push information, X is a screening value of the candidate push user, and $X_i$ is the screening value of the $i^{th}$ candidate push user; and selecting the at least one to-be-pushed user based on the push instruction and the screening value $X_i$ of the at least one candidate push user.

3. The method according to claim 2, wherein the method further comprises:

in response to the screening value of the candidate push user exists, calculating, based on the push instruction, a screening judgment value Y of the push instruction using a following formula:

$$Y = 2^{(T - t_0 + 2m + 1)} - 2^{(T - t_0)};$$

wherein, T is the planned push time of the to-be-pushed information, $t_0$ is a current time, m is the push interval of the to-be-pushed information, and the push interval of the to-be-pushed information m is equal to the push interval of the push information n; and performing an AND-operation on a binary value of the screening judgment value of the push instruction and a binary value of the screening value of the at least one candidate push user, determining whether a result is equal to 0, and determining the candidate push user as the to-be-pushed user in response to the result being equal to 0.

4. The method according to claim 1, wherein after the acquiring information about at least one candidate push user with a category of push information same as the category of the to-be-pushed information, the method further comprises:

updating, based on the push instruction, information about the at least one to-be-pushed user, wherein the information about the at least one to-be-pushed user comprises: the category of the push information, the planned push time of the push information, the push interval of the push information, and the push status.

5. The method according to claim 4, wherein after the pushing the to-be-pushed information to the at least one to-be-pushed user, the method further comprises:

updating, based on the push instruction, the information about the at least one to-be-pushed user, wherein the information about the at least one to-be-pushed user comprises: the category of the push information, the planned push time of the push information, the push interval of the push information, and the push status.

6. An information pushing device, the device comprising:

at least one processor; and a memory storing instructions, the instructions when executed by the at least one processor, cause the at least one processor to perform operations, the operations comprising:

acquiring a push instruction, the push instruction comprising: to-be-pushed information, a category of the to-be-pushed information, a planned push time of the to-be-pushed information and a push interval of the to-be-pushed information;

acquiring information about at least one candidate push user with a category of push information same as the category of the to-be-pushed information, the information about a candidate push user comprising: the category of the push information, a planned push time of the push information, the push information being pushed to the candidate push user at the planned push time of the push information, a push interval of the push information, and a push status;

selecting, based on the push instruction and the information about the at least one candidate push user, at least one to-be-pushed user, the at least one to-be-pushed user being at least one candidate push user not receiving the push information in a time length, a starting point of the time length being one push interval preceding the planned push time of the to-be-pushed information, and an ending point being a push interval succeeding the planned push time of the to-be-pushed information; and pushing the to-be-pushed information to the at least one to-be-pushed user.

7. The device according to claim 6, wherein the selecting, based on the push instruction and the information about the at least one candidate push user, at least one to-be-pushed users comprises:

calculating, based on the information about the at least one candidate push user, a screening value $X_i$ of the at least one candidate push user using a following formula:

$$X_i = 2^{(t_i - t_0 + n)};$$

wherein, i is a positive integer, and i≥1, t is the planned push time of the push information, $t_i$ is a planned push time of push information about an $i^{th}$ candidate push user, $t_0$ is a current time, n is the push interval of the push information, X is a screening value of the candidate push user, and $X_i$ is the screening value of the $i^{th}$ candidate push user; and selecting the at least one to-be-pushed user based on the push instruction and the screening value $X_i$ of the at least one candidate push user.

8. The device according to claim 7, wherein the operations further comprise:

calculating, in response to the screening value of the candidate push user exists, based on the push instruction, a screening judgment value Y of the push instruction using a following formula:

$$Y=2^{(T-t_0+2m+1)}-2^{(T-t_0)};$$

wherein, T is the planned push time of the to-be-pushed information, $t_0$ is a current time, m is the push interval of the to-be-pushed information, and the push interval of the to-be-pushed information m is equal to the push interval of the push information n; and performing an AND-operation on a binary value of the screening judgment value of the push instruction and a binary value of the screening value of the at least one candidate push user, determine whether a result is equal to 0, and determine the candidate push user as the to-be-pushed user, in response to the result being equal to 0.

9. The device according to claim 6, wherein the operations further comprise:
updating, based on the push instruction, information about the at least one to-be-pushed user, wherein the information about the at least one to-be-pushed user comprises: the category of the push information, the planned push time of the push information, the push interval of the push information, and the push status.

10. The device according to claim 9, wherein the operations further comprise:
updating, based on the push instruction, the information about the at least one to-be-pushed user, wherein the information about the at least one to-be-pushed user comprises: the category of the push information, the planned push time of the push information, the push interval of the push information, and the push status.

11. A non-transitory computer storage medium storing a computer program, wherein the computer program, when executed by a processor, cause the processor to perform operations, the operations comprising:
acquiring a push instruction, the push instruction comprising: to-be-pushed information, a category of the to-be-pushed information, a planned push time of the to-be-pushed information and a push interval of the to-be-pushed information;
acquiring information about at least one candidate push user with a category of push information same as the category of the to-be-pushed information, the information about a candidate push user comprising the category of the push information, a planned push time of the push information, the push information being pushed to the candidate push user at the planned push time of the push information, a push interval of the push information, and a push status;
selecting, based on the push instruction and the information about the at least one candidate push user, at least one to-be-pushed user, the at least one to-be-pushed user being at least one candidate push user not receiving the push information in a time length, a starting point of the time length being one push interval preceding the planned push time of the to-be-pushed information, and an ending point being a push interval succeeding the planned push time of the to-be-pushed information; and
pushing the to-be-pushed information to the at least one to-be-pushed user.

12. The method according to claim 2, wherein the method further comprises:
for each candidate push user in the at least one candidate push user, determining the candidate push user as the to-be-pushed user in response to a screening value of the candidate push user not existing.

* * * * *